(12) United States Patent
Ilangovan et al.

(10) Patent No.: US 9,990,273 B2
(45) Date of Patent: Jun. 5, 2018

(54) METHODS AND SYSTEMS FOR ANOMALY DETECTION

(71) Applicant: Tata Consultancy Services Limited, Mumbai (IN)

(72) Inventors: Ramkumar Ilangovan, Chennai (IN); Sayantan Das, Kolkata (IN); Shounak Kundu, Kolkata (IN); Swarup Chatterjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days. days.

(21) Appl. No.: 15/230,077

(22) Filed: Aug. 5, 2016

(65) Prior Publication Data

US 2017/0270038 A1    Sep. 21, 2017

(30) Foreign Application Priority Data

Mar. 17, 2016   (IN) .............................. 201621009340

(51) Int. Cl.
*G06F 9/44* (2018.01)
*G06F 11/36* (2006.01)
(Continued)

(52) U.S. Cl.
CPC ............ *G06F 11/3688* (2013.01); *G06F 8/70* (2013.01); *G06F 8/77* (2013.01); *G06F 9/44* (2013.01);
(Continued)

(58) Field of Classification Search
CPC ................................................. G06F 11/3688
(Continued)

(56) References Cited

U.S. PATENT DOCUMENTS 6,560,773 B1 * 5/2003 Alexander, III .... G06F 11/3466
707/999.202
7,861,060 B1 * 12/2010 Nickolls ................ G06F 9/522
712/22

(Continued)

OTHER PUBLICATIONS

Cabral, B. et al. "Exception Handling: A Field Study in Java and .NET," *Proceedings from the 21st European Conference on ECOOP 2007—Object-Oriented Programming*, Jul. 30-Aug. 3, 2007, Berlin, Germany; pp. 151-175.

*Primary Examiner* — Evral E Bodden
(74) *Attorney, Agent, or Firm* — Finnegan, Henderson, Farabow, Garrett & Dunner LLP

(57) ABSTRACT

This disclosure relates generally to anomaly detection, and more particularly to system and method for detecting anomalies. In one embodiment, the method includes executing at least one thread associated with the application. Executing the at least one thread results in invoking one or more methods associated with the at least one thread. During the execution metrics associated with the one or more methods are captured. The metrics are systematically arranged in a data structure to represent a plurality of thread-method pairs and the metrics corresponding to each of the plurality of thread-method pairs. One or more anomalies associated with the one or more methods are identified from the data structure based on a detection of at least one predetermined condition in the data structure. An anomaly of the one or more anomalies includes one of un-exited anomaly, an exception anomaly and a user-defined anomaly.

13 Claims, 3 Drawing Sheets

(51) Int. Cl.
  *G06F 11/34* (2006.01)
  *G06F 11/07* (2006.01)
(52) U.S. Cl.
  CPC .......... *G06F 11/34* (2013.01); *G06F 11/366* (2013.01); *G06F 11/3612* (2013.01); *G06F 11/3636* (2013.01); *G06F 11/0715* (2013.01); *G06F 11/0775* (2013.01)
(58) Field of Classification Search
  USPC ........................................................ 717/131
  See application file for complete search history.

(56) References Cited

U.S. PATENT DOCUMENTS

| | | | |
|---|---|---|---|
| 7,870,443 B2* | 1/2011 | Munjal | G06F 11/0715 |
| | | | 714/34 |
| 7,886,116 B1* | 2/2011 | Everitt | G06F 9/30043 |
| | | | 382/232 |
| 7,984,220 B2 | 7/2011 | Gerard et al. | |
| 8,074,116 B2 | 12/2011 | Pardoe et al. | |
| 8,572,617 B2* | 10/2013 | Shorb | G06F 9/522 |
| | | | 718/102 |
| 2003/0093456 A1 | 5/2003 | Steinbusch et al. | |
| 2006/0059496 A1* | 3/2006 | Joy | G06F 11/3636 |
| | | | 719/310 |
| 2009/0013208 A1 | 1/2009 | DiMuzio | |
| 2013/0226235 A1* | 8/2013 | Fermanian | A61L 27/20 |
| | | | 606/231 |

* cited by examiner

METHODS AND SYSTEMS FOR ANOMALY DETECTION

PRIORITY CLAIM

This U.S. patent application claims priority under 35 U.S.C. § 119 to: India Application No. 201621009340, filed on Mar. 17, 2016. The entire contents of the aforementioned application are incorporated herein by reference.

TECHNICAL FIELD

This disclosure relates generally to anomaly detection, and more particularly to system and method for detecting anomalies in the application runtime.

BACKGROUND

An anomaly or an exception may be reported during development and/or testing phase of an application. Programming logic exceptions like an incorrect call, an invalid parameter, divide by zero error, modules entering incorrect flow, and the like may occur in an application. Several background anomalies or exceptions go unnoticed because they may have little or no immediate impact on the application. But, if such exceptions are not fixed, they may manifest in a bigger way when the application is deployed in production environment.

Further during development of the application, the developers may tend to log anomalies in a log file for tracking purposes and to enable further analysis. However, for big applications, the log sizes are huge and there may be situations where some of the logged exceptions may be overlooked. Moreover, a developer may forget to log some anomalies which make it difficult to identify such anomalies. Such exceptions or anomalies go unnoticed and may lead to disastrous situations.

The inventors here have recognized several technical problems with such conventional systems, as explained below. There may be a possibility that out of the numerous modules present in an application number of them enter an alternate flow. Some of these may be due to the need of the application so that some functionality is properly performed. But a number of these are also due to some problems in coding or logic. Often this yields erroneous results due to incomplete execution of these modules. Fixing such logic may enable proper running of the application.

SUMMARY

Embodiments of the present disclosure present technological improvements as solutions to one or more of the above-mentioned technical problems recognized by the inventors in conventional systems. For example, in one embodiment, a processor-implemented method for detection of anomalies is provided. The method includes executing, via one or more hardware processors, at least one thread associated with the application. Executing the at least one thread results in invoking one or more methods associated with the at least one thread. Further, the method includes capturing, during the execution, via the one or more hardware processors, metrics associated with the one or more methods. Furthermore, the method includes systematically arranging, via the one or more hardware processors, the metrics in a data structure to represent a plurality of thread-method pairs and the metrics corresponding to each of the plurality of thread-method pairs. Moreover, the method includes identifying, from the data structure and via the one or more hardware processors, one or more anomalies associated with the one or more methods based on a detection of at least one predetermined condition in the data structure. An anomaly of the one or more anomalies includes one of un-exited anomaly, an exception anomaly and a user-defined anomaly In another embodiment, a system for anomaly detection in an application is provided. The system includes at least one memory and one or more hardware processors. The at least one memory is coupled to the one or more hardware processors and the one or more hardware processors are capable of executing programmed instructions stored in the at least one memory to execute at least one thread associated with the application. Executing the at least one thread results in invoking one or more methods associated with the at least one thread. Further, the one or more hardware processors are capable of executing programmed instructions to capture, during the execution, metrics associated with the one or more methods. Furthermore, the one or more hardware processors are capable of executing programmed instructions to systematically arrange the metrics in a data structure to represent a plurality of thread-method pairs and the metrics corresponding to each of the plurality of thread-method pairs. Moreover, the one or more hardware processors are capable of executing programmed instructions to identify, from the data structure, one or more anomalies associated with the one or more methods based on a detection of at least one predetermined condition in the data structure. An anomaly of the one or more anomalies comprises one of un-exited anomaly and exception anomaly and a user-defined anomaly.

In yet another embodiment, a non-transitory computer-readable medium having embodied thereon a computer program for executing a method for anomaly detection. The method includes executing at least one thread associated with the application. Executing the at least one thread results in invoking one or more methods associated with the at least one thread. Further, the method includes capturing, during the execution, metrics associated with the one or more methods. Furthermore, the method includes systematically arranging the metrics in a data structure to represent a plurality of thread-method pairs and the metrics corresponding to each of the plurality of thread-method pairs. Moreover, the method includes identifying, from the data structure, one or more anomalies associated with the one or more methods based on a detection of at least one predetermined condition in the data structure. An anomaly of the one or more anomalies includes one of un-exited anomaly, an exception anomaly and a user-defined anomaly.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
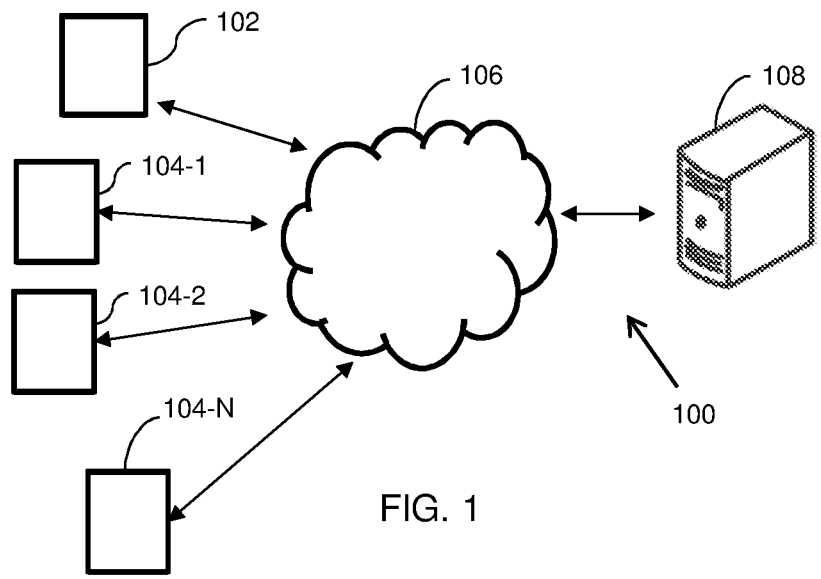
FIG. 1 illustrates a network implementation for detection of anomalies encountered during running of an application according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure relates to a system and methods for detection of anomalies encountered during running of an application. With reference to the present disclosure, an "application" may include "application software," which may contain one or more units of functionality (e.g., a web portal with email functionality, database programs, word processing programs, accounting programs, numerical analysis programs). An "application" may also include "services," which may contain one logical unit of functionality (e.g., an autonomous unit that is responsible for a transformation, storage and/or retrieval of data, such as a database management service or a database application programming interface (API) service). The services associated with the application may be pertaining to various programs associated with transactions or use-cases provided by the application. For instance, an online ticket booking application may include programs for various transactions or use-cases such as login to the application, searching for availability of tickets, online payments, hotel booking, cab-booking, and so on. In some embodiments, the application can be a stand-alone Java™ application. In some embodiments, the application can be a complex enterprise application that can utilize a plurality of resources. In an embodiment, the application may be a distributed application distributed in multiple tiers. Said multiple tiers may include a web interface, a database component and an application interface.

In certain scenarios, the applications may tend to behave unerringly in spite of different erroneous conditions occurring in application's background. For example, during development or testing phase of an application, several background errors or exceptions may go unnoticed because such errors may have little or no immediate impact on the application. Any deviation from the normal flow of an application which results in erroneous situations preventing the application to work as desired and hampering the normalcy of the application may be referred to as 'exception anomalies'. If the exception anomalies are not fixed in the application, they may manifest in a bigger way when the application is deployed in a production environment.

Also, during development of an application, developers tend to log errors that can be helpful to find out the problems occurring in application code. These errors may be logged but said errors may be overlooked or may remain unnoticed due to huge size of application logs that are generated during execution of the application. Due to huge size of application logs, subsequent analysis and fixing of the logs may become time-consuming. However, overlooking the errors may have devastating effects on the application's performance.

In certain other scenarios, various modules in the application may undergo or enter an alternate or erroneous flow. Some of the alternate or erroneous flows occur due to need of the application so that a particular functionality is properly performed. But a number of alternate or erroneous flows are also due to some problems in coding or logic. Often such alternate or erroneous flows may yield erroneous results due to the incomplete execution of logic associated with said modules. However, such errors, if not checked, may result in incomplete execution of said module. An example of an alternate flow can be a user while booking an online ticket, if account does not have enough balance, ticket booking will not be successful and blocked seats will be released immediately for other users. Here when account balance is not sufficient an obvious error triggered the alternate flow to stop booking and release the tickets. In this case, the intended alternate flow is to release the tickets.

Additionally, in certain scenarios another anomaly, known as, unexited anomaly may lead to mis-functioning of the application. A method may be performing certain functionality in an infinite loop, meaning thereby that the method running the loop is an unexited method. However, if the loop is an unintended loop, then such method may lead to an unexited anomaly. For example, in some scenarios, a deadlock may be formed, where two or more threads or programs may try to access one or more resources while locking one or more resources required for the other thread or program. In such a case the loop for accessing the one or more resources may be an infinite loop, thereby leading to unexited anomalies which are not intended.

The errors or anomalies associated with application execution, such as incomplete execution, logged errors which are not noticed, and so on, may accumulate and at a later time, may lead to application break down. Fixing such logic may be important for proper execution of the application.

The disclosed embodiments provide various methods and systems for detection of anomalies encountered during execution of an application. For example, in an embodiment, a system for anomaly detection is provided to capture anomalies such as exceptional errors and erroneous alternate flows encountered in running of an application, and present said anomalies so that corrective actions can be taken against the anomalies and the normality of the application restored.

Referring to FIG. 1, a network implementation 100 for detection of anomalies encountered in running of an application is illustrated, in accordance with an embodiment of the present subject matter. The network implementation 100 is shown to include a system 102, devices such as devices 104-1, 104-2 . . . 104-N, and a communication network 106 for facilitating communication between the system 102 and the devices 104-1, 104-2 . . . 104-N. In one embodiment, the system 102 facilitates common platform for analyzing anomalies encountered during the running of an application.

Although the present subject matter is explained considering the system 102 being implemented as a single device, it may be understood that the system 102 may also be implemented as a variety of computing systems, such as a laptop computer, a desktop computer, a notebook, a workstation, a mainframe computer, a network server, a tablet, a mobile phone, a robot and the like. In an example embodiment, the application can be a distributed application such that the application is distributed in multiple tiers. The multiple tiers of the application may include a web interface, a database component and an application interface. It will be understood that for the distributed applications, the multiple tiers may be distributed over different nodes, and disclosed system 102 may be embodied in said different nodes to collect the metrics from the respective distributed nodes.

It will be understood that the system 102 may be accessed by multiple users through the one or more devices 104-1, 104-2 . . . 104-N, collectively referred to as devices 104 hereinafter, or applications residing on the devices 104. Examples of the devices 104 may include, but are not limited to, a portable computer, a personal digital assistant, a handheld device, and a workstation. In order to run an application session, user devices 104 can establish a corresponding session with a server 108.

In an embodiment, each device 104 can establish a session with the server 108 for communicating with the server 108. The devices 104 can communicate with the server 108 through the communication network 106. The communication network 106 may be a wireless network, a wired network or a combination thereof. The communication network 106 can be implemented as one of the different types of networks, such as intranet, local area network (LAN), wide area network (WAN), the internet, and the like. The communication network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

The detection of the anomalies encountered during the running of the application can be performed by capturing all the metrics associated with one or more methods associated with one thread associated with the application. In some embodiments, a user can initiate a detection of the anomalies for an application running on the server 108 using the device (or a client) 104. In another embodiment, detection of the anomalies can be initiated automatically in a periodic manner.

A client, for instance the device 104, can establish a monitoring session with the server 108 for capturing anomalies. During the monitoring session, the application is monitored in a controlled environment with systematic execution of various threads and associated methods associated with an application running on a Java Virtual Machine (JVM) on the server 108.

During the systematic execution of the application in runtime environment, various metrics may be generated. In an embodiment, the system 102 captures said metrics. The system 102, embodied on the server 108, can record and store metrics associated with various methods associated with various threads for analysis running the monitoring session from the client 104. In some embodiments, the metrics can be stored in a memory on the server 108. Alternatively, the metrics can be stored in the memory of the system 102. In an embodiment, where the application is a distributed application, the metrics can be stored in respective multiple tiers/nodes, and can be collected by the system 102 for analysis.

In some embodiments, the system 102 may send the metrics to the client 104 for analysis. The client 104 can display the metrics recorded for the application running on the JVM in a graphical user interface (GUI) displayed on the device 104. The collection of the anomaly metrics can be either user triggered or auto configured. An example of a system for detection of anomalies associated with an application is described further with reference to FIG. 2.

Figure 2:
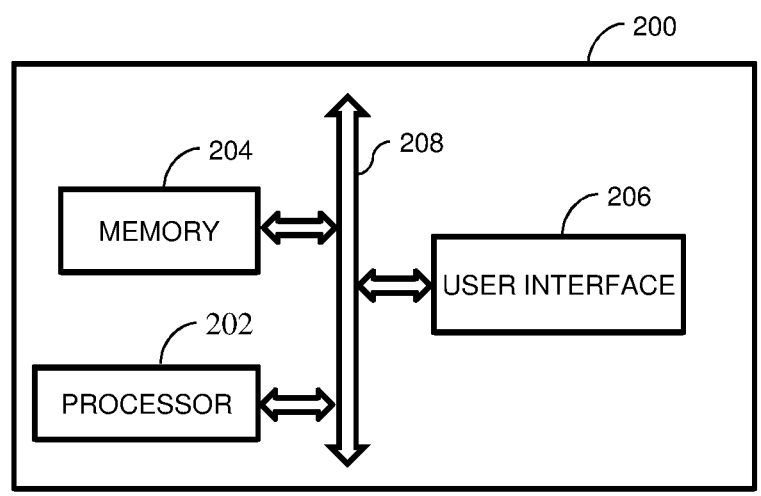
FIG. 2 is a functional block diagram of a system for detection of anomalies in an application according to some embodiments of the present disclosure.
Figure 3:
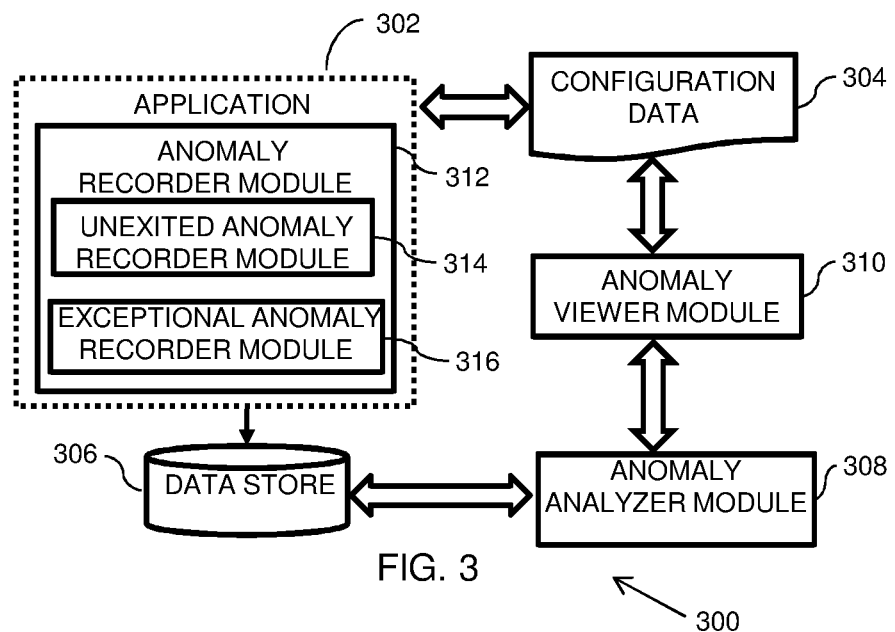
FIG. 3 illustrates an example representation of a functional flow for detecting anomalies encountered in an application in accordance with some embodiments of the present disclosure.

Now referring to FIG. 2 through FIG. 3, FIG. 2 illustrates a block diagram of a system 200 for detection of anomalies in an application, in accordance with an example embodiment. The system 200 is an example of the system 102 of FIG. 1. In an example embodiment, the system 200 can be embodied in a computing device. Alternatively, the system 200 can be embodied in a server (for instance, the server 108 of FIG. 1). In an embodiment, where the application is distributed in multiple tiers/nodes, the system can be distributedly embodied in said multiple tiers/nodes. In an embodiment, the system 200 facilitates in detection of anomalies encountered during running of an application based on an analysis of metrics generated during anomaly capturing session. It will be noted herein that the anomaly detection session may include a monitoring session during which, based on the metrics captured, the application behavior may be analyzed to detect the anomalies. Hence, the terms 'anomaly detection session' and monitoring session may be used interchangeably throughout the description. The system 200 includes or is otherwise in communication with at least one processor such as a processor 202, at least one memory such as a memory 204, and a user interface 206. In an embodiment, the processor 202, memory 204, and the user interface 206 may be coupled by a system bus such as a system bus 208 or a similar mechanism.

The processor 202 may include circuitry implementing, among others, logic functions associated with the anomaly detection. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The at least one memory such as a memory 204, may store several pieces of information or data, used by the system to implement the functions of the system. For instance, in an example embodiment, the memory 204 is configured to store the metrics generated during monitoring sessions of the application. In an embodiment, the monitoring of the application can be performed from the user interface of the system 200. For instance, a user can start the monitoring the application from the user interface of the system (or the client device such as the device 104 of FIG. 1). The memory 204 may include for example, volatile memory and/or non-volatile memory. The volatile memory may include, but are not limited to volatile random access memory (RAM).

The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some examples of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data pertaining to capturing of anomalies, applications, instructions or the like for anomaly analysis to carry out various functions in accordance with various example embodiments. Additionally or alternatively, the memory 204 may be configured to store instructions which when executed by the processor 202 causes the system 200 to behave in a manner as described in various embodiments.

In an embodiment, the system 200 is caused to initiate execution of the application. For instance, the system 200 may be caused to initiate the execution of the application in a monitoring session based on a user input. Herein, executing the application may refer to executing at least one thread associated with the application. The execution of the at least one thread results in invoking one or more methods associated with the at least one thread. The system 200 may be caused to capture metrics associated with the one or more methods during the monitoring session. In an embodiment, the metrics associated with a method may include method name, method invocation timestamp, method exit timestamp, method stack-trace, exception name, exception cause, and exception timestamp.

In an embodiment, the system 200 may include an anomaly recorder module which may be integrated with the running application for capturing one or more methods associated with the threads. The anomaly recorder module may be configured by the processor 202 and may be a component which acts as an agent, collects the relevant metrics from the application and save the metrics to a data store (for example, the memory 204). In an embodiment, the anomaly recorder module is capable of being attached to the application and further injecting binary execution logics in the application to thereby capture one or more metrics associated with the methods of the threads during the execution of the application. For example, for a Java™ based application, the anomaly recorder module can use Byte Code Instrumentation (BCI) technology to embed itself to the application. Using BCI, a sample Java™ application can be transformed to collect metrics as required. In an embodiment, the system 200 is caused to transform classes and binaries of the application for enabling the anomaly recorder module to collect relevant data (or metrics) required for capturing anomalies. For example, when the application is initiated, a signal may be sent to anomaly recorder module to initiate the monitoring session. In an example embodiment, the signal may be sent based on a user input. Alternatively, the signal may be sent automatically based on some predetermined criteria. For instance, the monitoring session may be initiated a start of the application. Alternatively the monitoring session may be initiated through sampling (for example, monitoring for first ten minutes for every hour, or monitoring every alternate hours, or monitoring only when CPU usage is very high or very low, and so on. Herein, it will be noted that the predetermined criteria for selecting the monitoring session is not limited to the criteria defined herein, and the said criteria can be extended to various scenarios.

In an embodiment, when the application is initiated, classes are loaded by a class loader in a runtime environment. The anomaly recorder module transforms the bytecodes of the application classes using, for example, BCI. BCI may transform already loaded classes as well as the new classes being loaded into the JVM based on the one or more filtering rules. In an embodiment, the filtering rules may be customizable rules, for example, the rules may be defined based on user inputs to obtain transformed classes. In another embodiment, default (or in-built rules) may be selected as the filtering rules. In an embodiment, transformed classes may act as a point of metrics collection for the anomaly recorder module to record anomalies such as un-exited anomalies, exceptional anomalies, and user-defined anomalies.

In an embodiment, the system 200 is caused to systematically arrange the metrics in a data structure to represent a plurality of thread-method pairs and the metrics corresponding to each of the plurality of thread-method pairs. In an embodiment, the data-structure can be a multi-level data structure having an outer data structure and an inner data structure.

In an embodiment, first level of the multi-level data structure may include a unique thread identifier as a key. Each thread may call multiple methods and each method may experience multiple anomalies. An example of correspondence between the methods and threads is provided with an example in the table below:

TABLE 1

| | | |
|---|---|---|
| Thread 1 | Method 1 | Anomaly 1-1 |
| | Method 1 | Anomaly 1-2 |
| | Method 2 | Anomaly 2-1 |
| | Method 2 | Anomaly 2-2 |
| | Method 2 | Anomaly 2-3 |
| Thread 2 | Method 3 | Anomaly 3-1 |
| | Method 4 | Anomaly 4-1 |
| | | Anomaly 4-2 |
| | | Anomaly 4-3 |
| | Method 5 | Anomaly 5-1 |
| | | Anomaly 5-2 |

As shown in Table 1, the execution of the application may result in threads, such as thread 1 and thread 2. Each thread may invoke multiple methods. For example, the thread 1 may invoke method 1 and method 2 and also thread 2 may invoke methods 3, 4 and 5. One or more methods associated with the threads may experience anomalies. For example, method 1, may experience anomalies such as anomaly 1-1, anomaly 1-2, method 2 may experience anomalies such as anomaly 2-1, anomaly 2-2, anomaly 2-3 and method 3 may experience anomalies such as anomaly 3-1, and so on.

In an embodiment, the system 200 is caused to store anomaly data having the metrics associated with the one or more methods from the data structure. In an embodiment, the memory 204 includes or is otherwise in communication with a data store for storing the identified anomalies in the methods. A detailed example of the multi-level data structure is described further with reference to FIG. 4.

In an embodiment, the system 200 may be caused to identify, from the data structure, one or more anomalies associated with the one or more methods based on a detection of at least one predetermined condition in the data structure. In an embodiment, the system 200 may include an anomaly analyzer module for identifying the anomalies associated with the methods based on the metrics. In an embodiment, the predetermined condition associated with the metrics may be different for different types of anomalies. For example, to identify unexited anomalies in the method, the predetermined condition may include detecting an absence of the method exit timestamp in the metrics corresponding to the method. Accordingly, in the present embodiment, based on the metrics recorded, the system 200 may be caused to identify the un-exited anomaly in a method of the one or more methods by detecting absence of the method exit timestamp in the metrics corresponding to the method. In an embodiment, the system 200 may include an Unexited Recorder (UR) module for identifying and recording the un-exited anomalies. The UR module and the identification of the unexited anomalies by the UR module are described further in detail with reference to FIG. 3.

In another embodiment, to identify exception anomaly in the method, the predetermined condition may include detection of exception name, exception cause, and exception timestamp corresponding to the method in the metrics. In an embodiment, the system 200 may include an exception recorder (ER) module for identifying the exception anomaly in the application. In an embodiment, the ER module may identify the exception anomaly in the application based on detection of exception name, exception cause, and exception timestamp corresponding to the method in the metrics. The ER module and the identification of the exception anomalies by the ER module are described further in detail with reference to FIG. 3.

In yet another embodiment, the system 200 is caused to identify the user-defined anomalies in the application. In the present embodiment, the at least one predetermined condition is defined by a user to identify the user-defined anomaly to capture exceptional and un-exited anomalies in the method. For example, the user may select one or more specific methods for which the exceptional anomalies may be included or excluded. In an embodiment, the user may select the specific methods by utilizing the UI 206. For example, a method called "userMethod" may be a user-defined attribute. Here, in case a predetermined condition is defined as "capturing all exceptional anomalies occurring in the method" by the user, the anomaly recorder module may capture the exceptional anomalies occurring in the method. Alternatively, if the user defined attribute includes a predetermined condition, such as "Excluding or ignoring the exceptional anomalies occurring in the method", then all exceptional anomalies occurring in said method may be ignored by the system 200.

In another example embodiment, the user may select certain customized exceptions in the application other than a pre-defined set of exceptions. In an embodiment, the system 200 may be caused to receive exception details (such as name and type) of such user-defined exceptions as parameters. In an embodiment, said exception details may be input to the anomaly recorder module of the system 200. Once said exception details are defined in the system 200, the anomaly recorder module may capture such exceptional anomalies occurring in the application.

In certain scenarios, unexited method may be necessary for proper running of the application, depending on the application logic. For example, the method may be performing certain functionality in an infinite loop, meaning thereby that the method running the loop is an unexited method, and may be reported by the anomaly recorder. In this case it is to be noted that the method is unexited method but not an unexited anomaly, and hence the method is to be provided as an exception to the anomaly recorder module. In the present embodiment, such method name is provided as parameters to the system so that the anomaly recorder module excludes/ignores even if the method is an un-exited method.

In an embodiment, the system 200 may be caused to display the analyzed anomaly data associated with the anomalies. In an embodiment, the system 200 may include an anomaly viewer module to display the analyzed anomaly data. In an embodiment, the memory 204 may include or is in communication with the anomaly viewer module. In an embodiment, the system 200 is configured to display the anomaly data on the UI 206 of the system.

As discussed above the system 200 may incorporate various modules such as an anomaly viewer module, anomaly analyzer module, anomaly recorder module, and a metrics data store for performing various functionalities associated with anomaly detection system. Said modules may be stored in the memory 204 of the system 200, or may be communicatively coupled to system 200. The processor 202 is configured to execute said modules. An example functional architecture of the anomaly detection system 200 including the modules is described further with reference to FIG. 3.

FIG. 3 illustrates an example representation of a functional flow 300 for detecting anomalies encountered in an application, for example, the application 302 in accordance with an example embodiment. The functional flow is shown to include flow amongst various blocks including configuration data 304, a data store 306, an anomaly analyzer module 308, an anomaly viewer module 310, and an anomaly recorder module 312 associated with the application 302. Said blocks collectively configures a system for anomaly detection of an application, and can be embodied in the system 200 (FIG. 2).

The application 302 herein represents a target application that may be a web-application or a thick-client application. In certain scenarios, running the application 302 (or executing threads of the application 302) may be encountered with one or more errors or anomalies. Particularly, execution of the threads involves methods associated with said threads, and in some scenarios the methods may be associated with anomalies. Examples of such anomalies may include un-exited anomalies, exception anomalies and user-defined anomalies, and the like, as explained with reference to FIGS. 1 and 2. The process flow 300 may facilitate in detection of said anomalies in the application 302. The anomaly recorder module 312 may be a profiler agent that may be attached with the application 302. In an embodiment, the anomaly recorder 312 is configured to capture the anomalies associated with the application 302, and periodically collect relevant data (such as metrics) associated with the application. In an embodiment, the anomaly recorder module 312 may be launched at an application startup and made to capture data from the beginning of execution of the application. Alternatively, anomaly recorder module 312 may be invoked at any point during the running of the application 302. The anomaly recorder module 312 may be capable of attaching itself to the running application, and initiate capturing the metrics, thereby allowing running of the application uninterrupted without restarting. Herein, it will be noted that the anomaly recorder module 312 is inbuilt with a special capability to capture all the processes with alternative or anomalous flows, thus preventing said flows or errors to go unnoticed and cause problems during the execution of the application.

The configuration data 304 includes the data regarding capturing of metrics. For instance, the configuration data 304 may include information such as what data to be captured in the metrics, at what time the data has to be captured, and so on. In an embodiment, the configuration data 304 may be provided by a user, and may be stored prior to initiating the anomaly capturing session to capture anomalies encountered in running of an application. In an example embodiment, default auto-generated standard configurations may be used for capturing the metrics. For example, for a standard J2EE (Java 2 Platform Enterprise Edition) application with Struts framework, standard configurations pertaining that framework can be loaded. For a back-end Java batch application, configurations pertaining to batch programs can be loaded.

The anomaly recorder module 312 captures the metrics in the data store 306. For instance, the metrics data store 306 can store method name, method invocation timestamp, method exit timestamp, method stack trace, exception name, exception cause, and exception timestamp associated with a method. In an embodiment, the metrics may be systematically stored in form of a multi-level data-structure.

In an example embodiment, the anomaly recorder module 312 may include an unexited anomaly recorder (UR) module 314 and an exceptional anomalies recorder (ER) module 316. The UR module 314 is capable of recording/capturing the unexited anomalies using BCI. In an embodiment, on invocation of every method the UR module 314 records the thread ID and method name, and inserts an Invocation timestamp in the data-structure. In an embodiment, the UR module 314 may record the metrics during the monitoring session or profiling session until the anomaly recorder module 312 is directed by the anomaly viewer module to stop profiling. In another embodiment, the monitoring session may be stopped in case the application 302 is force stopped, and accordingly the recording of metrics may be stopped. In an embodiment, on completion of every method, the UR module 314 checks details such as the exit timestamp for each of the methods. On determination of one or more methods having no exit timestamp, said one or more methods may be identified as unexited. The entry having the identified method as unexited method may be stored in the data store 306 in the multi-level data structure.

In an embodiment, the ER module 316 is capable of recording/capturing the exception anomalies using BCI. Herein, an exception may be defined as an event which occurs during the execution of an application program such that said program disrupts normal flow of the program's instructions. When an exceptional flow or anomaly occurs within a method, the method creates an object and hands-off the object to a runtime system. A runtime system (also called runtime system or just runtime) is a software designed to support the execution of computer programs written in a computer language. In Java, runtime is referred to as Java Runtime Environment (JRE). In DotNet framework, the runtime is referred to as Common Language Runtime (CLR). The object that is created during the exceptional flow is called an exception object, and includes information regarding the anomaly occurred in the application. In an embodiment, the exception object may be sent to ER module 316. The ER module 316 extracts exception details retrieved from the exception object using BCI. On invocation of a method, the ER module 316 inserts one entry in Anomaly Metrics (AM) containing thread ID and Method Name. For example, when an exception occurs, the ER module 316 captures the thread ID of the thread in which the exception occurred. Also, the ER module 316 records exception details such as Exception name, Exception cause, timestamp and stacktrace and updates said exception details in the data store 306. The entry having the exception details may be considered to be one entry of Anomaly Metrics (AM) for exception anomaly and is stored in the data-store 306 in the multi-level data structure. An example multi-level data structure in accordance with the present disclosure is explained further in detail in the FIG. 4.

The data store 306 is coupled with the anomaly analyzer module 308. The metrics captured at the data store 306 is provided to the anomaly analyzer module 308, and the anomaly analyzer module 308 analyzes the data for anomalies occurring in the running of the application 302. In an embodiment, the anomaly analyzer module 308 may be configured to identify, from the data structure, one or more anomalies associated with the one or more methods based on a detection of at least one predetermined condition in the data structure.

In an embodiment, the anomaly analyzer module 308 reads the data through the data structure, and processes the data in a format mentioned in the anomaly metrics. The anomaly analyzer module 308 loops through the thread identifiers of multiple threads in the data structure, and retrieves names of corresponding methods under each of the thread identifiers. The anomaly analyzer module 308 further retrieves data including exception details and anomaly details corresponding to each of the methods from the data store 306. The anomaly analyzer module 308 determines exception details, invocation timestamp and Method stacktrace from the data retrieved from the data store 306 to identify the unexited anomaly. Additionally or alternatively, the anomaly analyzer module 308 determines exception details including Exception name, Exception cause and timestamp from data store 306 to identify the exception anomaly.

The anomaly viewer module 310 is coupled to the anomaly analyzer module, and based on the scenario/transactions that are performed, anomaly viewer module 310 is configured to present or display an analysis indicating the type of anomaly encountered by the application. The anomaly viewer module 310 may also enable a user to provide inputs pertaining to capturing of the metrics. For instance, a. user may mention specific method names from which user wants to include or exclude exceptional anomalies. For example, a method called "userMethod" is set by the user as user defined attribute. In case, the user sets positive condition, all exceptional anomalies occurring in the method are captured by anomaly recorder. However, in case the user sets negative condition, all exceptional anomalies occurring in the method are ignored.

b. The user can use certain customized exceptions in the associated application other than the pre-defined set of exceptions. The user can provide details (name and type) of such user defined exceptions as parameters to anomaly recorder. Once these exception details are set, the anomaly recorder can capture such exceptional anomalies occurring in the application.

c. Unexited anomalies in certain cases may be necessary for proper running of the application. This again depends on the application logic. For example, the application may be performing certain functionality in an infinite loop. This means that the method running the loop is an unexited one, and is reported by the anomaly recorder module. The user can pass such method names as parameters so that the anomaly recorder may determine which methods it should ignore even if said methods are unexited.

Figure 4:
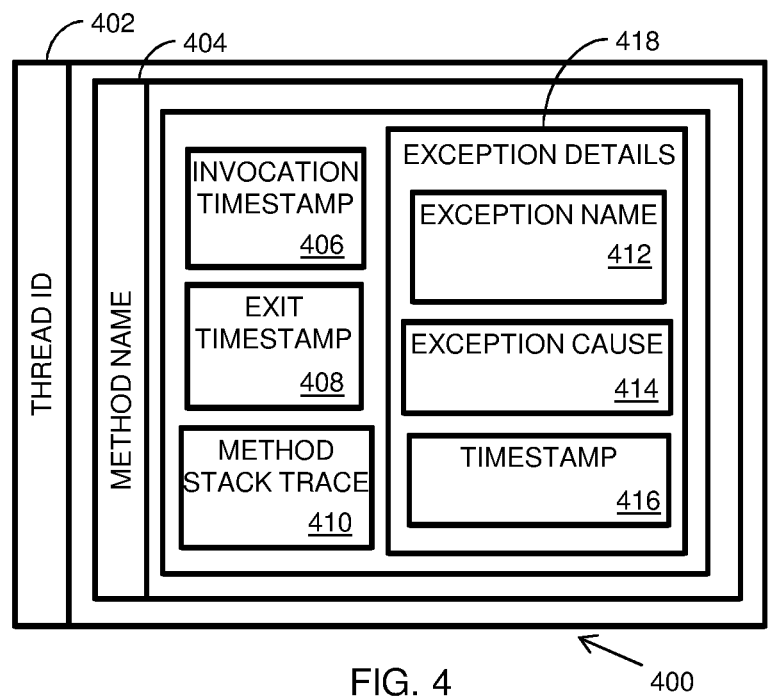
FIG. 4 illustrates example architecture of a multi-level data structure for storing the captured metrics for detection of anomalies encountered during running of an application according to some embodiments of the present disclosure.

FIG. 4 illustrates an architecture of a multi-level data structure, in accordance with an example embodiment. As discussed with reference to FIGS. 2 and 3, every thread associated with the application is assigned a corresponding unique identifier. The unique identifier for each thread is as Thread ID. The metrics generated on execution of the application are stored in the multi-level data structure, for example, the data structure 400. In an embodiment, the multi-level data structure includes an outer datastructure 402 and an inner datastructure 404. In the outer datastructure 402, the thread ID is stored as a unique identifier.

In the inner data structure 404, method details such as method name, method invocation timestamp, exit timestamp, method stacktrace are mapped to every unique thread ID. Also, in the inner data structure 404, every method name is stored as a unique identifier and method details such as method invocation timestamp 406, exit timestamp 408, method stacktrace 410 are mapped to the method identifier. The exception details such as exception name 412, exception cause 414, and timestamp 416 are stored in a separate datastructure called Exception Details (ED) 418. In case of unexited methods, the ED data structure 418 is empty. The combination of ED and method details is termed as Anomaly and Exception Model (AEM).

Figure 5:
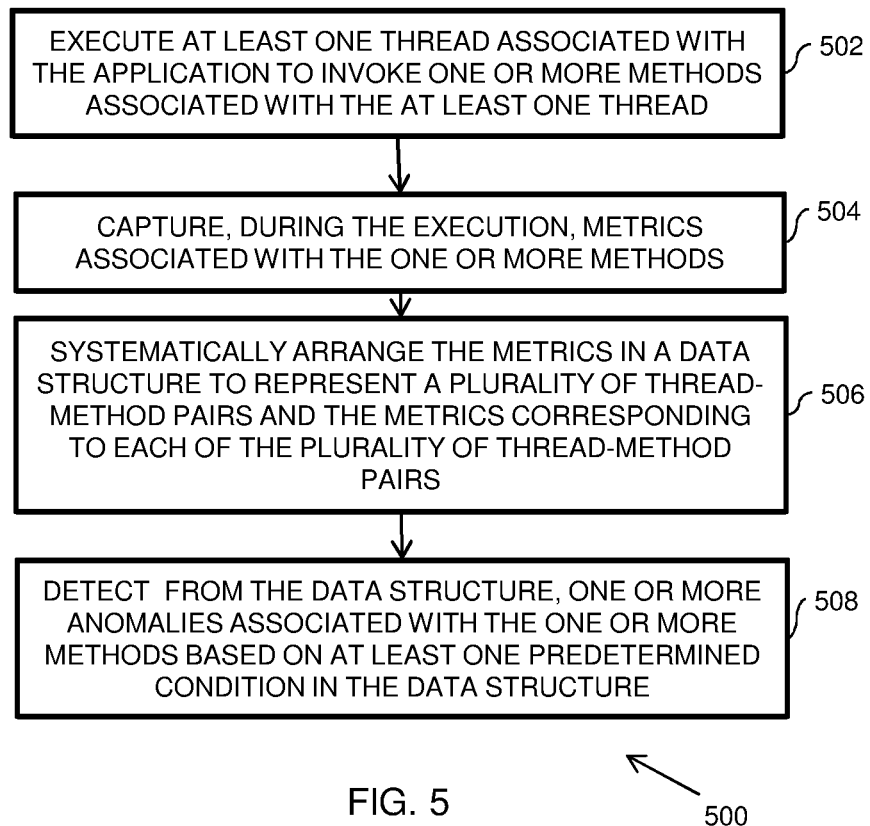
FIG. 5 is a flow diagram illustrating a method for detection of anomalies encountered during running of an application in accordance with some embodiments of the present disclosure.

A flow diagram illustrating a method for detecting anomalies encountered during running of an application is described further with reference to FIG. 5

FIG. 5 illustrates a flow diagram of a method 500 for detecting anomalies encountered during running of an application, in accordance with an example embodiment. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method 500 can be implemented in any suitable hardware, software, firmware, or combination thereof. However, for ease of explanation, in the embodiments described below, the method 500 may be considered to be implemented in the above described system 102 (FIG. 1) and/or system 200 (FIG. 2).

At 502, at least one thread associated with the application is executed. In an embodiment, executing the at least one thread results in invoking one or more methods associated with the at least one thread. At 504, metrics associated with the one or more methods during execution are captured. The details of a metric data structure for storing the captured metrics is explained with reference to FIG. 4. At 506, based on the metrics that are periodically captured, the metrics are arranged in the data structure to represent the plurality of thread method pair. At 508, different types of anomalies encountered during running of an application is detected from the arranged metric.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments of the disclosure provide method and system detection of anomaly encountered during running of an application. An anomaly or an exception is a deviation in the programming logic which leads to particular error conditions in execution of the application. Several background anomalies or exceptions go unnoticed because they may have little or no immediate impact on the application. But, if such exceptions are not fixed, they may manifest in a bigger way when the application is deployed in production environment. Sometime the application may end up giving erroneous results due to the incomplete execution of modules. Capturing all the anomalies and exceptions and presenting in a meaningful way can help developers in taking appropriate corrective action to correct the application. Various embodiments of the present disclosure provides systematic approach to monitor application and collect relevant metric to capture anomalies such as exceptional errors and erroneous alternate flows encountered in running of an application so that corrective actions can be taken against the anomalies and the normality of the application restored.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for anomaly detection in an application, the method comprising
   systematically executing at least one thread associated with the application, wherein executing the at least one thread results in invoking one or more methods associated with the at least one thread, wherein the at least one thread is systematically executed upon establishing a monitoring session with a server that runs the application;
   periodically capturing, during the execution, metrics associated with the one or more methods during the monitoring session, wherein the metrics are generated during systematic execution of the application in runtime environment, wherein the metrics are periodically captured using a default auto-generated standard configuration;
   systematically arranging the metrics in a data structure to represent a plurality of thread-method pairs and the metrics corresponding to each of the plurality of thread-method pairs; and
   identifying, from the data structure, one or more anomalies associated with the one or more methods based on a detection of at least one predetermined condition associated with the metrics in the data structure, wherein an anomaly of the one or more anomalies comprises one of unexited anomaly, an exception anomaly and a user-defined anomaly.

2. The method of claim 1, wherein the metrics associated with the one or more methods comprises method name, method invocation timestamp, method exit timestamp, method stack-trace, exception name, exception cause, and exception timestamp.

3. The method of claim 1, wherein identifying the un-exited anomaly in the one or more methods comprises detecting absence of the method exit timestamp in the metrics associated with the one or more methods.

4. The method of claim 1, wherein identifying the exception anomaly in the one or more methods comprises detecting exception name, exception cause, and exception timestamp in the metrics associated with the one or more methods.

5. The method of claim 1, wherein the at least one predetermined condition is defined by a user to identify the user-defined anomaly in the method.

6. The method of claim 1, wherein the application is a distributed application having multiple layers, the distributed application comprising one or more of at least one web interface, at least one database component and at least one application interface.

7. A system for anomaly detection in an application comprising:
   at least one memory; and
   one or more hardware processors, the at least one memory coupled to the one or more hardware processors wherein the one or more hardware processors are capable of executing programmed instructions stored in the at least one memory to:
      systematically execute at least one thread associated with the application, wherein executing the at least one thread results in invoking one or more methods associated with the at least one thread, wherein the at least one thread is systematically executed upon establishing a monitoring session with a server that runs the application;
      periodically capture, during the execution, metrics associated with the one or more methods during the monitoring session, wherein the metrics are generated during systematic execution of the application in runtime environment, wherein the metrics are periodically captured using a default auto-generated standard configuration;
      systematically arrange the metrics in a data structure to represent a plurality of thread-method pairs and the metrics corresponding to each of the plurality of thread-method pairs; and
      identify, from the data structure, one or more anomalies associated with the one or more methods based on a detection of at least one predetermined condition associated with the metrics in the data structure, wherein an anomaly of the one or more anomalies comprises one of un-exited anomaly and exception anomaly and a user-defined anomaly.

8. The system of claim 7, wherein the metrics associated with the one or more methods comprises method name, method invocation timestamp, method exit timestamp, method stack-trace, exception name, exception cause, and exception timestamp.

9. The system of claim 7, wherein the at least one processor is capable of executing programmed instructions to identify the un-exited anomaly in the one or more methods comprises detecting absence of the method exit timestamp in the metrics associated with the one or more methods.

10. The system of claim 7, wherein at least one processor is capable of executing programmed instructions to identify the exception anomaly in the one or more methods comprises detecting exception name, exception cause, and exception timestamp in the metrics associated with the one or more methods.

11. The system of claim 7, wherein the at least one predetermined condition is defined by a user to identify the user-defined anomaly in the method.

12. The system of claim 7, wherein the application is a distributed application having multiple layers, the multiple layers comprising one or more of at least one web interface, at least one database component and at least one application interface.

13. A non-transitory computer-readable medium having embodied thereon a computer program for executing a method for anomaly detection, the method comprising:
   systematically executing at least one thread associated with the application, wherein executing the at least one thread results in invoking one or more methods associated with the at least one thread, wherein the at least one thread is systematically executed upon establishing a monitoring session with a server that runs the application;
   periodically capturing, during the execution, metrics associated with the one or more methods during the monitoring session, wherein the metrics are generated during systematic execution of the application in runtime environment, wherein the metrics are periodically captured using a default auto-generated standard configuration;

systematically arranging the metrics in a data structure to represent a plurality of thread-method pairs and the metrics corresponding to each of the plurality of thread-method pairs; and identifying, from the data structure, one or more anomalies associated with the one or more methods based on a detection of at least one predetermined condition associated with the metrics in the data structure, wherein an anomaly of the one or more anomalies comprises one of unexited anomaly, an exception anomaly and a user-defined anomaly.

* * * * *